(12) United States Patent
Eguchi et al.

(10) Patent No.: US 8,377,608 B2
(45) Date of Patent: Feb. 19, 2013

(54) ARRANGEMENT STRUCTURE OF GASEOUS FUEL FILLING PORT FOR MOTORCYCLE

(75) Inventors: Tohru Eguchi, Shizuoka-ken (JP); Kazuyuki Hirota, Shizuoka-ken (JP)

(73) Assignee: Suzuki Motor Corporation, Hamamatsu-shi (JP)

( * ) Notice: Subject to any disclaimer, the term of this patent is extended or adjusted under 35 U.S.C. 154(b) by 514 days.

(21) Appl. No.: 12/657,449

(22) Filed: Jan. 21, 2010

(65) Prior Publication Data

US 2010/0252554 A1  Oct. 7, 2010

(30) Foreign Application Priority Data

Apr. 3, 2009  (JP) .................. 2009-091354

(51) Int. Cl.
*H01M 8/04* (2006.01)
*B62D 61/02* (2006.01)

(52) U.S. Cl. .................. 429/515; 180/220; 220/562

(58) Field of Classification Search .................. 429/515; 180/220; 220/562
See application file for complete search history.

(56) References Cited

U.S. PATENT DOCUMENTS

| 7,913,784 B2 * | 3/2011 | Horii et al. ................. 180/220 X |
| 2007/0092764 A1 * | 4/2007 | Kobayashi ........................ 429/9 |
| 2007/0122671 A1 * | 5/2007 | Shimizu et al. ................. 429/26 |
| 2007/0178343 A1 * | 8/2007 | Muramatsu ..................... 429/22 |
| 2008/0118791 A1 * | 5/2008 | Ito et al. .......................... 429/13 |

FOREIGN PATENT DOCUMENTS

| JP | 2006-056376 A | 3/2006 |
| JP | 2008-247311 A | 10/2008 |

\* cited by examiner

*Primary Examiner* — Stephen J. Kalafut
(74) *Attorney, Agent, or Firm* — Flynn, Thiel, Boutell & Tanis, P.C.

(57) ABSTRACT

A fuel filling port is inclined at a predetermined angle in a vertical direction such that a filling nozzle is inserted slantwise from above when a body is supported in an upright posture by a center stand to prevent a motorcycle from falling over even if a filling nozzle is pressingly inserted into the fuel filling port.

4 Claims, 4 Drawing Sheets

ARRANGEMENT STRUCTURE OF GASEOUS FUEL FILLING PORT FOR MOTORCYCLE

BACKGROUND OF THE INVENTION

1. Field of the Invention

The present invention relates to an arrangement structure of a gaseous fuel filling port for a motorcycle and, more particularly, to an arrangement structure of a gaseous fuel filling port for a motorcycle, in which a fuel tank is filled with fuel.

2. Description of the Related Art

In some motorcycles, a body includes thereon: a fuel tank to be filled with hydrogen gas through a filling nozzle inserted into a fuel filling port; a fuel cell for generating electric power owing to the hydrogen gas supplied from the fuel tank; and a drive motor for generating power to be supplied to drive wheels by the electric power generated by the fuel cell.

Japanese Patent Application Laid-open (JP-A) No. 2006-56376 discloses an arrangement structure of a gaseous fuel filling port for a motorcycle, in which a fuel filling port is arranged independently of and in the vicinity of a plug of a fuel tank at the rear portion of the motorcycle. Otherwise, JP-A No. 2008-247311 discloses a motorcycle in which a drive motor is driven by electric power generated by a fuel cell, and then, power is supplied from the drive motor to drive wheels. A protector covering the side portion of a fuel tank is visually exposed.

However, in a motorcycle in the prior art, if a filling nozzle is pressingly inserted into a fuel filling port when a fuel tank is filled with hydrogen gas, the center of gravity of the motorcycle is undesirably deviated from the center of the motorcycle according to the arrangement of the fuel filling port. As a consequence, the motorcycle may possibly fall down by the application of the weight of the motorcycle per se. Therefore, an improvement has been demanded.

SUMMARY OF THE INVENTION

In view of the above, an object of the present invention is to provide an arrangement structure of a gaseous fuel filling port for a motorcycle, in which the motorcycle can be prevented from falling down even if a filling nozzle is pressingly inserted into a fuel filling port when a fuel tank is filled with hydrogen gas.

The present invention is characterized by an arrangement structure of a gaseous fuel filling port for a motorcycle, including on a body: a fuel tank to be filled with hydrogen gas supplied through a filling nozzle inserted into a fuel filling port, a fuel cell for generating electric power owing to the hydrogen gas to be supplied from the fuel tank, and a drive motor for generating power to be supplied to a drive wheel from the electric power generated by the fuel cell. The arrangement structure includes a center stand for supporting the motorcycle body in an upright posture and a side stand for supporting the body in an inclined and erect posture. The fuel filling port is inclined at a predetermined angle in a vertical direction such that the filling nozzle is inserted slantwise from above when the body is supported in the upright posture by the center stand.

With the arrangement structure of the gaseous fuel filling port for the motorcycle according to the present invention, the motorcycle can be prevented from falling down even if the filling nozzle is pressingly inserted into the fuel filling port when the fuel tank is filled with hydrogen gas.

DETAILED DESCRIPTION OF THE INVENTION

Figure 1:
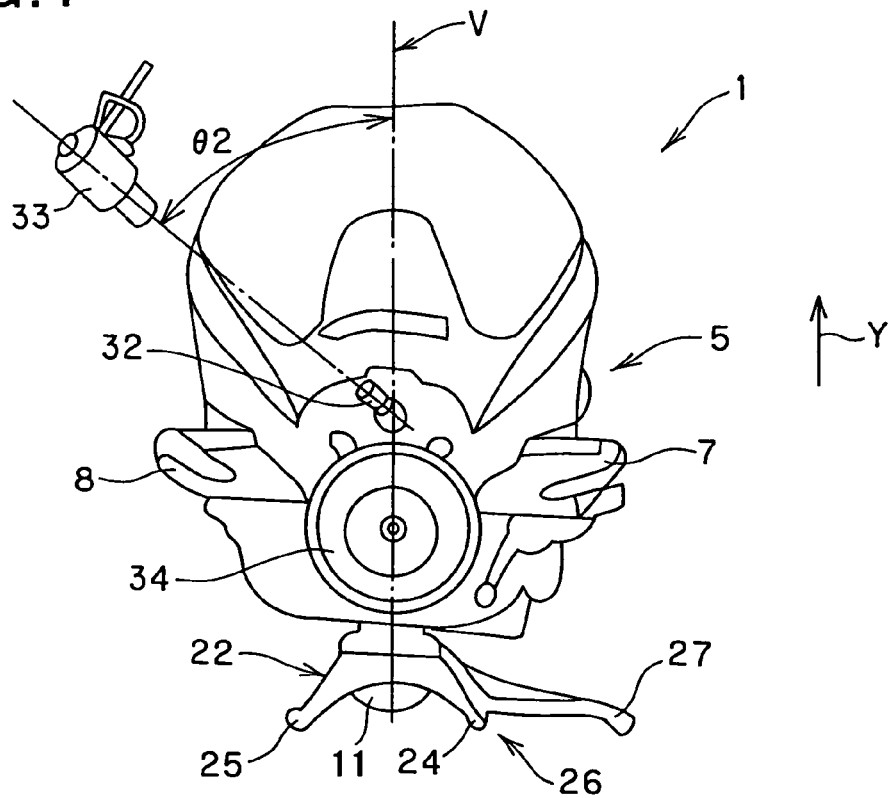
FIG. 1 is a cross-sectional view showing a motorcycle supported in an upright posture by a center stand, taken along a line I-I of FIG. 3.

The present invention is directed to achieving the object of preventing a motorcycle from falling down even if a filling nozzle is pressingly inserted into a fuel filling port when a fuel tank is filled with hydrogen gas.

FIGS. 1 to 7 show embodiments according to the present invention. In FIGS. 1 to 4, there is shown a motorcycle 1 with a fuel cell (hereinafter simply referred to as "a motorcycle") including a front portion 2, a central portion 3, a rear portion 4, a body 5, a body frame 6, a right foot rest 7, a left foot rest 8, a seat 9, a front wheel 10, and a rear wheel 11.

Figure 5:
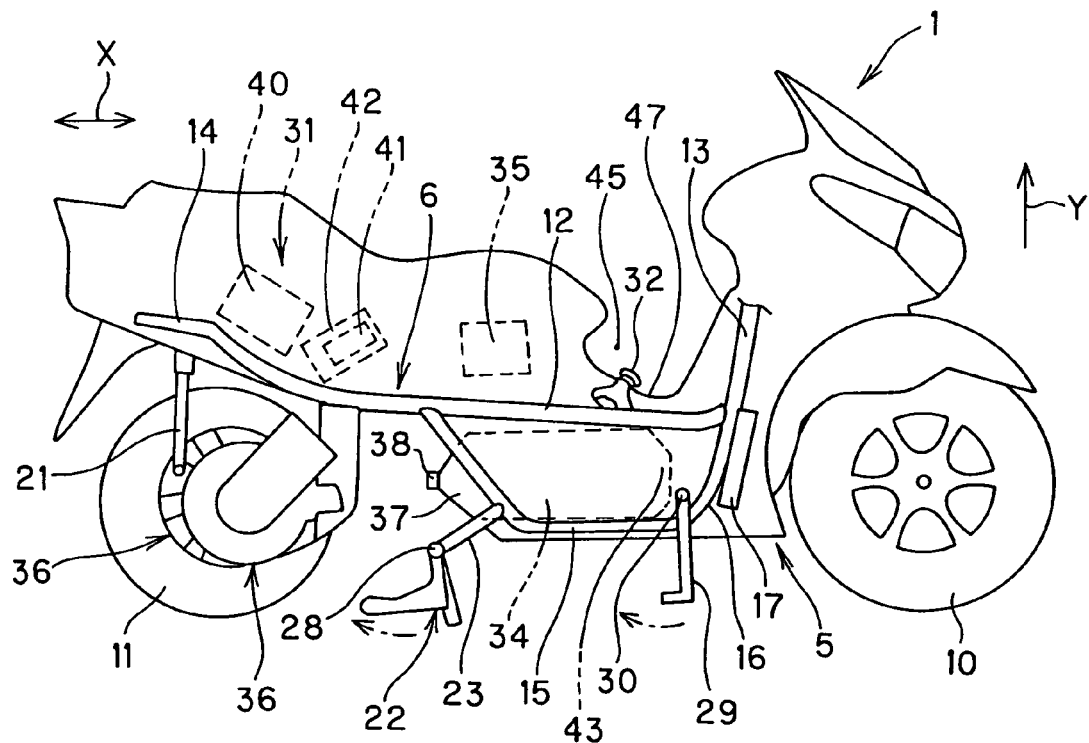
FIG. 5 is a right side view showing components of the fuel cell system of the motorcycle.
Figure 6:
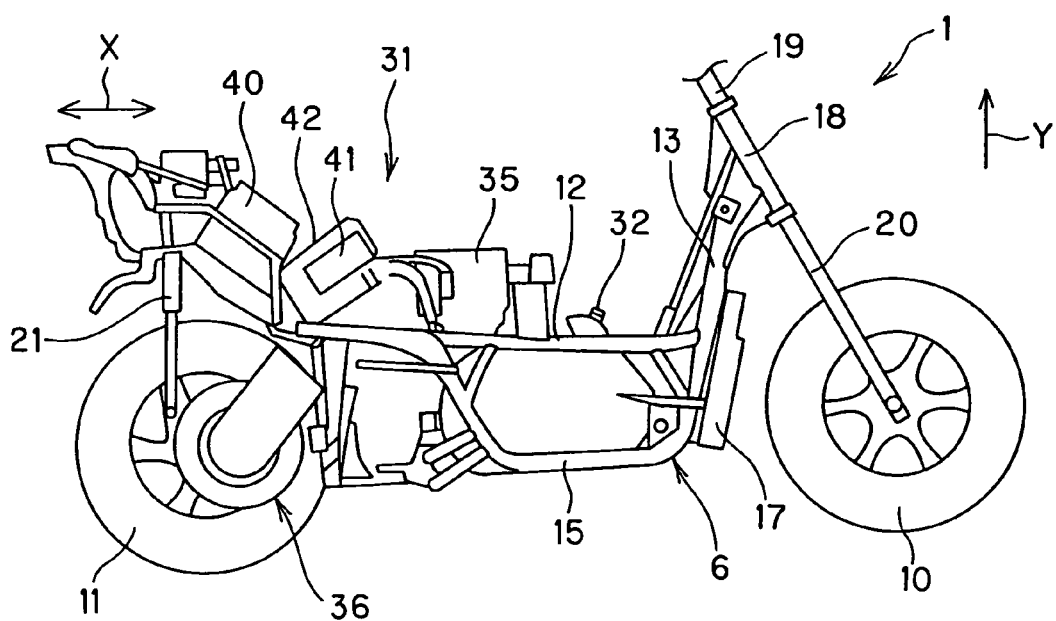
FIG. 6 is a right side view showing the motorcycle in which parts including a seat are detached.
Figure 7:
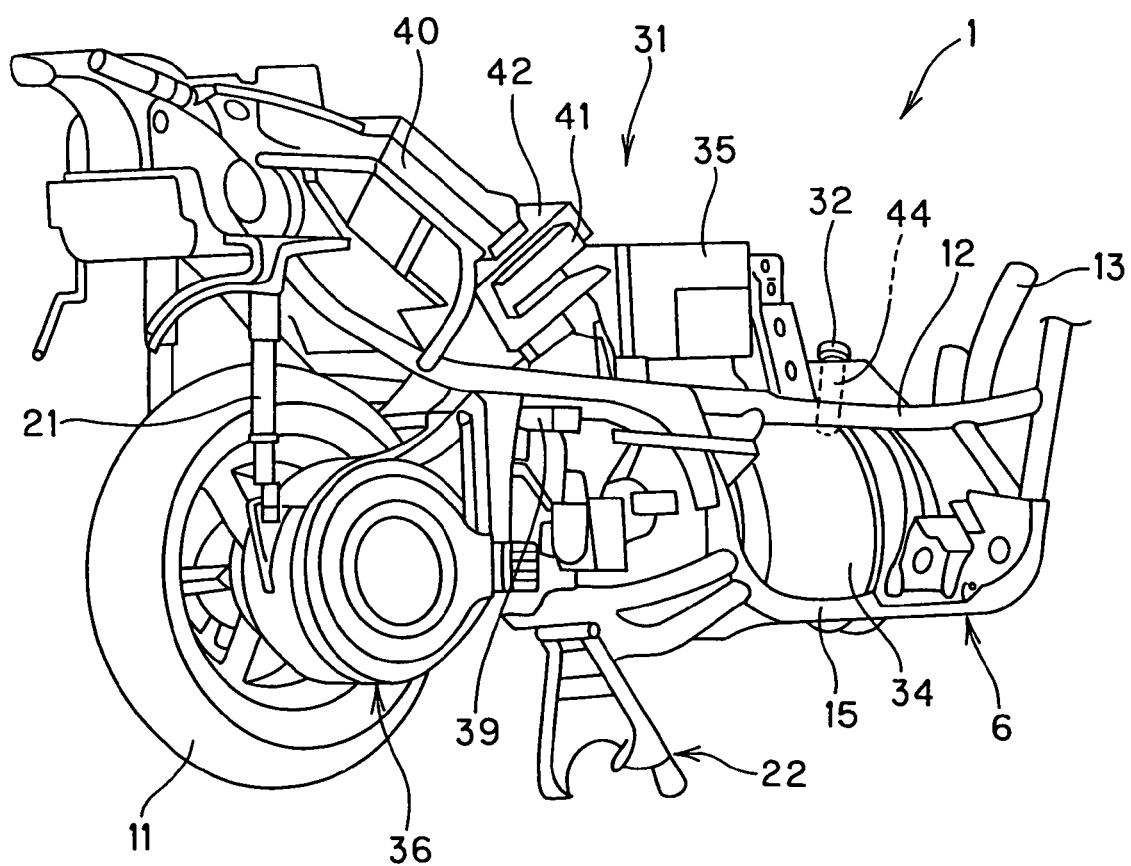
FIG. 7 is a perspective view showing the motorcycle, as viewed slantwise from behind on the right.

As shown in FIGS. 5 to 7, the body frame 6 is integrally constituted of a center frame 12 extending in a motorcycle lengthwise direction X at the central portion 3 of the motorcycle, a front frame 13 disposed continuously to the front portion of the center frame 12 and extending slantwise from above in the front at the front portion 2 of the motorcycle, a rear frame 14 disposed continuously to the rear portion of the center frame 12 at the rear portion 4 of the motorcycle and extending slantwise from above in the back, and a U-shaped lower frame 15 disposed continuously to the lower portion of the center frame 12.

At a vertically extending front surface 16 of the lower frame 15, a motorcycle controller 17 is fixed at the front portion 2 of the motorcycle and rearward of the front wheel 10.

As shown in FIG. 6, a supporting pipe 18 extending generally vertically is disposed continuously to the front frame 13. A steering shaft 19 is connected to the upper portion of the supporting pipe 18. Further, a front wheel suspension 20 for supporting the front wheel 10 is connected to the lower portion of the supporting pipe 18. In contrast, a rear wheel suspension 21 for supporting the rear wheel 11 is connected to the rear frame 14.

A center stand 22 is fixed to a fixing bracket 23 disposed continuously to the lower frame 15 at the lower portion at substantially the center in the motorcycle lengthwise direction X in the body 5. The center stand 22 includes a main support 26 provided with a right ground 24 and a left ground 25 and a sub support 27 extending rightward at the right ground 24, and is disposed swingably rearward on a center stand pivot 28 of the fixing bracket 23, so that the body 5 can be supported in an upright posture (i.e., in a vertical direction Y) at substantially the center in the lower portion.

Figure 2:
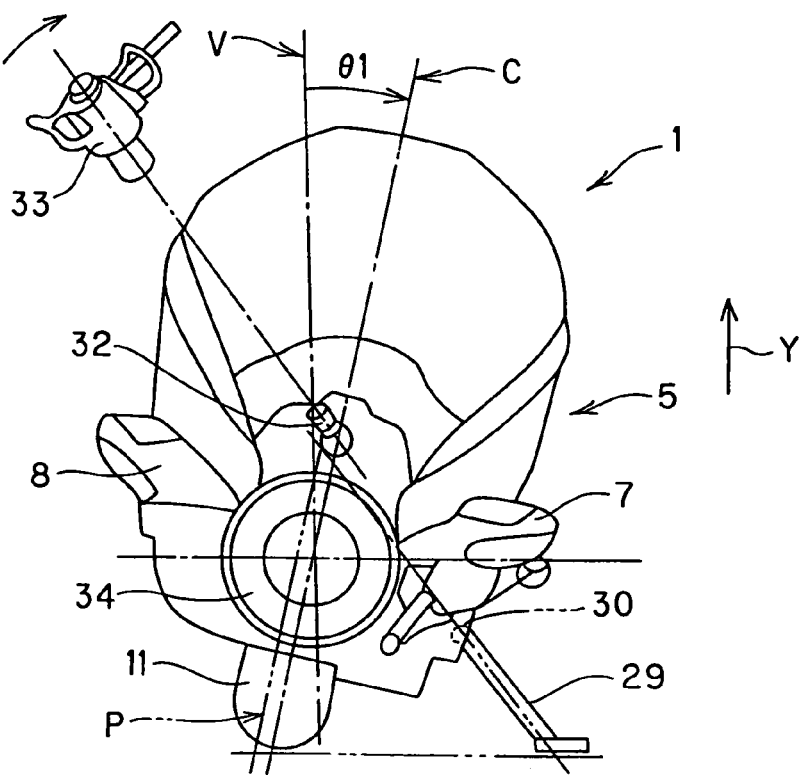
FIG. 2 is a cross-sectional view showing the motorcycle supported in an inclined posture by a side stand, taken along the line I-I of FIG. 3.
Figure 3:
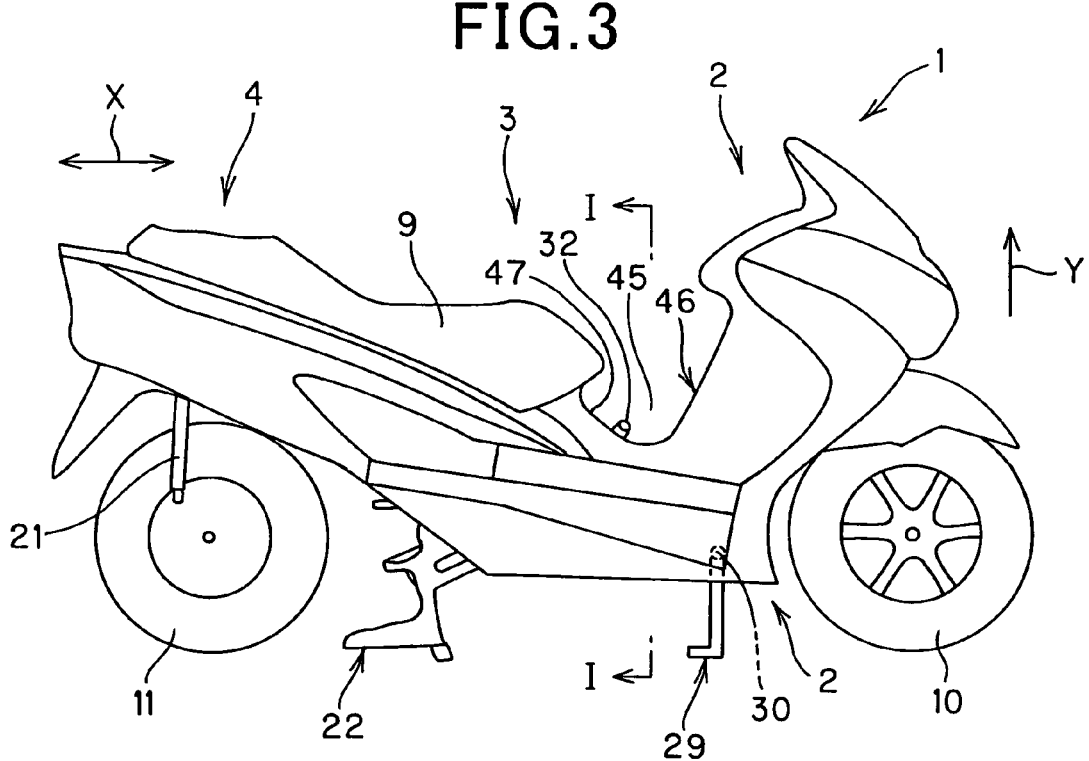
FIG. 3 is a right side view showing the motorcycle.
Figure 4:
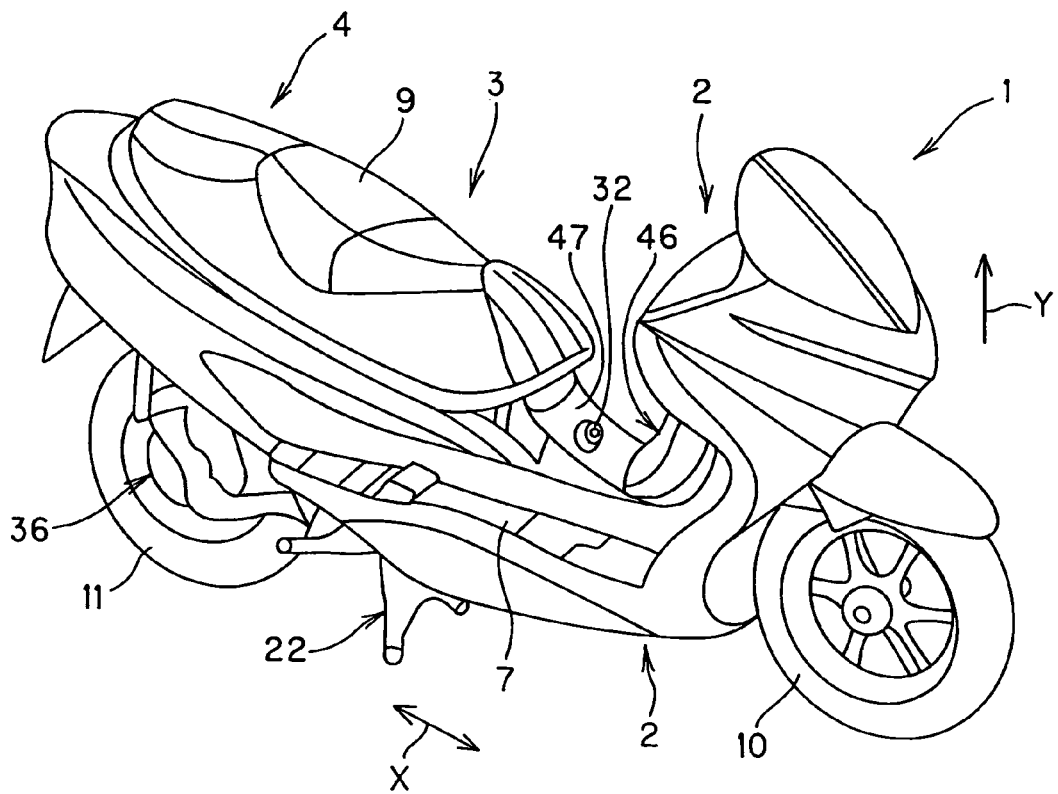
FIG. 4 is a rightward perspective view showing the motorcycle.

As shown in FIGS. 2, 3, and 5, a side stand 29 is additionally fixed to the body 5. The side stand 29 is disposed forward of the center stand 22 in the body and swingably rearward on a side stand pivot 30 of the lower frame 15, so that the body 5 can be supported in an upright posture while being inclined at a predetermined angle θ1 rightward with respect to a vertical line V in the vertical direction Y.

As shown in FIGS. 5 to 7, the body 5 mounts a fuel cell system 31 thereon.

The fuel cell system 31 includes a fuel tank 34, which is filled with hydrogen gas to be supplied through a filling nozzle inserted into a fuel filling port (i.e., a receptacle) 32, a fuel cell 35 for generating electric power owing to the hydrogen gas to be supplied from the fuel tank 34, and a drive motor 36 for generating power to be supplied to the rear wheel 11 serving as a drive wheel, by the electric power generated in the fuel cell 35.

The fuel tank 34 is adapted to contain therein the hydrogen gas of a high pressure (e.g., at a pressure of 350 atmospheres). The fuel tank 34 extends in its longitudinal direction, that is, in the motorcycle lengthwise direction X at the central portion 3 of the motorcycle in the lower portion of the seat 9, so that the fuel tank 34 is supported by the center frame 12 and the lower frame 15.

The fuel tank 34 is provided with a tank valve 38 at a side end 37 rearward of the tank at the rear portion of the motorcycle, and further, is connected to a pressure reducing valve 39 (see FIG. 7).

The fuel cell 35 is interposed between the fuel tank 34 and the seat 9.

A secondary battery 40 for accumulating electric power is disposed above the rear wheel 11 at the rear portion 4 of the motorcycle.

Moreover, a motor controller 41 and a power converter/distributor 42 are disposed between the fuel cell 35 and the secondary battery 40.

The drive motor 36 is disposed rightward of the rear wheel 11, as viewed in front of the body 5.

The motorcycle 1 is a so-called hybrid motorcycle to be driven by the fuel cell 35 and the secondary battery 40. Each of the parts, such as the fuel tank 34 and the fuel cell 35 in the fuel cell system 31, is arranged at a predetermined position so as to balance the total weight of the body 5.

As shown in FIGS. 1 to 4, the fuel filling port 32 is disposed at the tip of a filling pipe 44 (FIG. 7) extending in the vicinity of the fuel tank 34 and upward of a tank front end 43 of the fuel tank 34. In addition, the fuel filling port 32 projects at the center in a lateral direction of a cavity 47 in a body cover 46 defining a recessed space 45 between the right foot rest 7 and the left foot rest 8 and between the seat 9 and the front portion 2 of the motorcycle. Further, the fuel filling port 32 is oriented upward and leftward of the motorcycle. In this manner, the fuel filling port 32 is arranged at the center in the lateral direction of the cavity 47 rearward of the front portion 2 of the motorcycle, so that the fuel filling port 32 can be protected from a flying stone or the like from the front portion of the motorcycle, and further, can be avoided from being thermally damaged.

As shown in FIG. 1, the fuel filling port 32 is arranged such that the body center C is inclined at a predetermined angle (an acute angle) θ2 leftward of the body with respect to the vertical line V in the vertical direction Y in such a manner as to allow the filling nozzle 33 to be inserted slantwise from above on the left when the body 5 is supported in the upright posture by the center stand 22.

In this way, the body 5 can be prevented from falling down even if the filling nozzle 33 is pressingly inserted into the fuel filling port 32 when the body 5 is supported in the upright posture by the center stand 22.

In contrast, as shown in FIG. 2, while a body 5 inclines the body center C in the right at an angle of θ1 to the vertical line V of the vertical direction Y, when being supported by the side stand 29 at erect posture, the fuel filling port 32 is formed so that a fuel restoration nozzle 33 may be inserted toward the direction of the tip of the side stand 29. Therefore, the fuel filling port 32 is positioned above the rear wheel 11, so that the positional interrelationship among the fuel filling port 32, the tip of the side stand 29, and the rear wheel 11 is established in a triangle, as viewed in the motorcycle lengthwise direction X (indicated by a chain double-dashed line P in FIG. 2). As a consequence, the center of gravity of the body 5 can be oriented toward the motorcycle center. Thus, the body 5 can be prevented from falling down even if the filling nozzle 33 is pressingly inserted into the fuel filling port 32. Additionally, the fuel tank 34 can be readily filled with the hydrogen gas through the filling nozzle 33 disposed above.

The arrangement structure of the gaseous fuel filling port according to the present invention can be applied to not only a motorcycle using the hydrogen gas but also motorcycles using other gaseous fuels.

What is claimed is:

1. An arrangement structure of a gaseous fuel filling port for a motorcycle, including on a body: a fuel tank to be filled with hydrogen gas supplied through a filling nozzle inserted into a fuel filling port, a fuel cell for generating electric power owing to the hydrogen gas to be supplied from the fuel tank, and a drive motor for generating power to be supplied to a drive wheel from the electric power generated by the fuel cell, the arrangement structure comprising:
    a center stand for supporting the body in an upright posture; and
    a side stand for supporting the body in an inclined and erect posture;
    wherein the fuel filling port is inclined at a predetermined angle from the vertical direction such that the filling nozzle is inserted slantwise from above when the body is supported in the upright posture by the center stand.

2. The arrangement structure of a gaseous fuel filling port for a motorcycle according to claim 1, wherein the fuel filling port is arranged at a center in a lateral direction of a body cover defining a recessed space between a right foot rest and a left foot rest and between a seat and a front portion of the motorcycle.

3. An arrangement structure of a gaseous fuel filling port for a motorcycle according to claim 2, wherein when the center is supported by the side stand in the erect posture which is inclined at the predetermined angle from the vertical direction, a mutual physical relationship of a fuel filling port, a tip of the side stand, and a wheel is formed in a triangle when viewed from a lengthwise direction of the motorcycle.

4. An arrangement structure of a gaseous fuel filling port for a motorcycle according to claim 3, wherein the fuel filling port is formed so that the filling nozzle may be inserted toward a direction of the tip of the side stand.

* * * * *